(12) United States Patent
Sharan et al.

(10) Patent No.: US 10,565,585 B2
(45) Date of Patent: Feb. 18, 2020

(54) METHOD AND SYSTEM FOR IDENTIFYING LINKED CARDS FROM AUTHORIZATION RECORDS

(71) Applicant: MASTERCARD ASIA/PACIFIC PTE LTD., Singapore (SG)

(72) Inventors: Ashutosh Sharan, Gurgaon (IN); Sanket Rajendra Nerkar, Mumbai Naka (IN); Mayank Prakash, Dehradun (IN)

(73) Assignee: MASTERCARD ASIA PACIFIC PTE LTD., Singapore (SG)

( * ) Notice: Subject to any disclaimer, the term of this patent is extended or adjusted under 35 U.S.C. 154(b) by 799 days.

(21) Appl. No.: 15/074,151

(22) Filed: Mar. 18, 2016

(65) Prior Publication Data
US 2016/0275495 A1    Sep. 22, 2016

(30) Foreign Application Priority Data
Mar. 20, 2015    (SG) .......................... 10201502201 U (51) Int. Cl.
*G06Q 20/38*      (2012.01)
*G06Q 20/40*      (2012.01)

(52) U.S. Cl.
CPC .......... *G06Q 20/38* (2013.01); *G06Q 20/405* (2013.01)

(58) Field of Classification Search
CPC .............................. G06Q 20/405; G06Q 20/38

USPC .......................................................... 705/39
See application file for complete search history.

(56) References Cited

U.S. PATENT DOCUMENTS

| | | | | |
|---|---|---|---|---|
| 2010/0169182 A1* | 7/2010 | Madani | ................ | G06Q 20/102 705/21 |
| 2012/0203698 A1* | 8/2012 | Duncan | .................. | G06Q 20/34 705/44 |

* cited by examiner

*Primary Examiner* — Robert R Niquette
*Assistant Examiner* — Liz P Nguyen
(74) *Attorney, Agent, or Firm* — Buchanan Ingersoll & Rooney PC (57) ABSTRACT

A computer-implemented method of detecting associated payment devices comprises: receiving, by a processor from a payment network, transaction data representing a plurality of transaction records, a transaction amount, a transaction time, a terminal identifier, and a result code indicating success or failure of a transaction; identifying from said transaction records a declined transaction associated with a first payment device identifier, and determining a terminal identifier and transaction amount associated with the declined transaction; identifying from said transaction records a subsequent transaction occurring within a predetermined window of the declined transaction, the subsequent transaction being associated with the same terminal identifier and the same transaction amount as the declined transaction, the subsequent transaction being associated with a second payment device identifier that is different from the first payment device identifier; and storing, in a database, an association between the second payment device identifier and the first payment device identifier.

18 Claims, 4 Drawing Sheets

METHOD AND SYSTEM FOR IDENTIFYING LINKED CARDS FROM AUTHORIZATION RECORDS

BACKGROUND

The present invention relates to methods and systems for identifying payment cards which are associated through their pattern of use, for example, multiple payment cards used by an individual, or by several individuals residing in the same household, for example.

Payment devices, such as debit cards and credit cards, are used for transactions at a wide variety of merchants. It is relatively common for an individual or for different members of a household to use multiple cards or other devices issued by different issuing institutions such as banks. Quite frequently, a purchaser may attempt a transaction on one card which is declined for one reason or another (for example, due to there being insufficient credit in the account linked to the card), and subsequently use an alternative card to attempt the same transaction.

Although it is possible to identify all of the cards associated with an individual if the cards are all issued by the same bank, since the cards may automatically be associated with the individual in the bank's database, this is not possible where there are different issuing institutions. Further, it may not be possible to identify linked cards associated with different individuals even when they reside in the same household.

There remains a need for a method of identifying cards which are associated with each other by their usage pattern.

SUMMARY

Some embodiments of the presently disclosed method relate to a computer-implemented method of detecting associated payment devices, the method comprising:
  receiving, by a processor from a payment network, transaction data representing a plurality of transaction records, each transaction record comprising a payment device identifier, a transaction amount, a transaction time, a terminal identifier, and a result code indicating success or failure of a transaction;
  identifying from said transaction records, by said processor, a declined transaction associated with a first payment device identifier, and determining a terminal identifier and transaction amount associated with the declined transaction;
  identifying from said transaction records, by said processor, a subsequent transaction occurring within a predetermined window of the declined transaction, the subsequent transaction being associated with the same terminal identifier and the same transaction amount as the declined transaction, the subsequent transaction being associated with a second payment device identifier that is different from the first payment device identifier; and
  storing, in a database, an association between the second payment device identifier and the first payment device identifier.

In some embodiments, the predetermined window is a predetermined time window. The predetermined time window may be dependent on one or more criteria selected from: merchant; merchant category; time of day; day of week; mode of transaction; and terminal type. The method may comprise determining the predetermined time window by: identifying, using said processor, transaction records satisfying the one or more criteria; and determining, using said processor, from the time and date fields of the transaction records satisfying the one or more criteria, an average or median time between transactions; whereby the predetermined time window is the average or median time between transactions.

The method may comprise generating from the transaction data, using said processor, a list of merchants for which more than a predetermined percentage of the transaction amounts are the same. The predetermined percentage may be 50%.

Some embodiments may comprise determining, using said processor, whether the terminal identifier is associated with a merchant in said list of merchants. The method may comprise updating the database to remove or downweight said association.

In some embodiments the method further comprises, prior to identifying the declined transaction, filtering the transaction data using said processor to remove transaction records corresponding to merchants in said list of merchants.

Some embodiments relate to a system for detecting associated payment devices, comprising an association detection component which is configured to:
  receive, from a payment network, transaction data representing a plurality of transaction records, each transaction record comprising a payment device identifier, a transaction amount, a transaction time, a terminal identifier, and a result code indicating success or failure of a transaction;
  identify, from said transaction records, a declined transaction associated with a first payment device identifier, and determine a terminal identifier and transaction amount associated with the declined transaction;
  identify, from said transaction records, a subsequent transaction occurring within a predetermined window of the declined transaction, the subsequent transaction being associated with the same terminal identifier and the same transaction amount as the declined transaction, the subsequent transaction being associated with a second payment device identifier that is different from the first payment device identifier; and
  store, in a database, an association between the second payment device identifier and the first payment device identifier.

Other embodiments relate to a non-transitory computer-readable medium for detecting associated payment devices, the computer-readable medium having stored thereon program instructions for causing at least one processor to:
  receive, from a payment network, transaction data representing a plurality of transaction records, each transaction record comprising a payment device identifier, a transaction amount, a transaction time, a terminal identifier, and a result code indicating success or failure of a transaction;
  identify, from said transaction records, a declined transaction associated with a first payment device identifier, and determining a terminal identifier and transaction amount associated with the declined transaction;
  identify, from said transaction records, a subsequent transaction occurring within a predetermined window of the declined transaction, the subsequent transaction being associated with the same terminal identifier and the same transaction amount as the declined transaction, the subsequent transaction being associated with a second payment device identifier that is different from the first payment device identifier; and
  store, in a database, an association between the second payment device identifier and the first payment device identifier.

Embodiments of the disclosed method and system can assist card issuers and other entities to identify risk associated with different members in a family, and accordingly provide suggestions on ways to improve their credit score.

In addition, information in relation to linked cards may assist in prediction of average family income, which can then be used by credit providers, insurance providers and the like to target the right type of product to the right type of family. Further, the information can be used to offer services such as joint credit card facilities, campaigns for couples and so on. In addition, the information derivable according to embodiments of the invention can be used to identify the decision making person in a particular family, and hence any promotions can be communicated directly to him or her instead of sending the promotion to every family member.

BRIEF DESCRIPTION OF THE DRAWINGS

Embodiments of the disclosed method and system will now be described, by way of non-limiting example only, with reference to the accompanying drawings in which.

DETAILED DESCRIPTION OF EMBODIMENTS

Embodiments of the presently disclosed method and system relate to processes and systems for detecting associated payment devices, such as payment cards. The cards may be associated with a particular individual and/or with several individuals, for example different members of the same household. In general terms, transaction records are searched to locate a declined transaction associated with a first payment card, and subsequent transactions from the same terminal (for example, a POS terminal, an ATM or the like) are searched to determine whether they are for the same amount as the declined transaction, and occur within a predetermined time window. Payment cards associated with such subsequent transactions are flagged as being associated or linked with the first payment card.

As used herein, the term "database" may refer to a body of data, a relational database management system (RDBMS), or both. A database may include any collection of data including hierarchical databases, relational databases, flat file databases, object-relational databases, object oriented databases, and any other structured collection of records or data that is stored in a computer system. The above examples are for illustration only, and are not intended to limit in any way the definition and/or meaning of the term database.

As used herein, the terms "transaction card," "financial transaction card," and "payment card" refer to any suitable cashless payment device, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, transponder devices, NFC-enabled devices, and/or computers. Each type of transaction card can be used as a method of payment for performing a transaction. In addition, consumer card account behaviour can include but is not limited to purchases, management activities (e.g., balance checking), bill payments, achievement of targets (meeting account balance goals, paying bills on time), and/or product registrations (e.g., mobile application downloads).

The systems and processes of the presently described embodiments make use of transaction data representing a plurality of transaction records. The transaction data may be acquired by a payment network (such as a credit card network), during the course of a series of transactions between issuing banks operating accounts on behalf of cardholders, and acquiring banks operating accounts on behalf of merchants.

Figure 1:
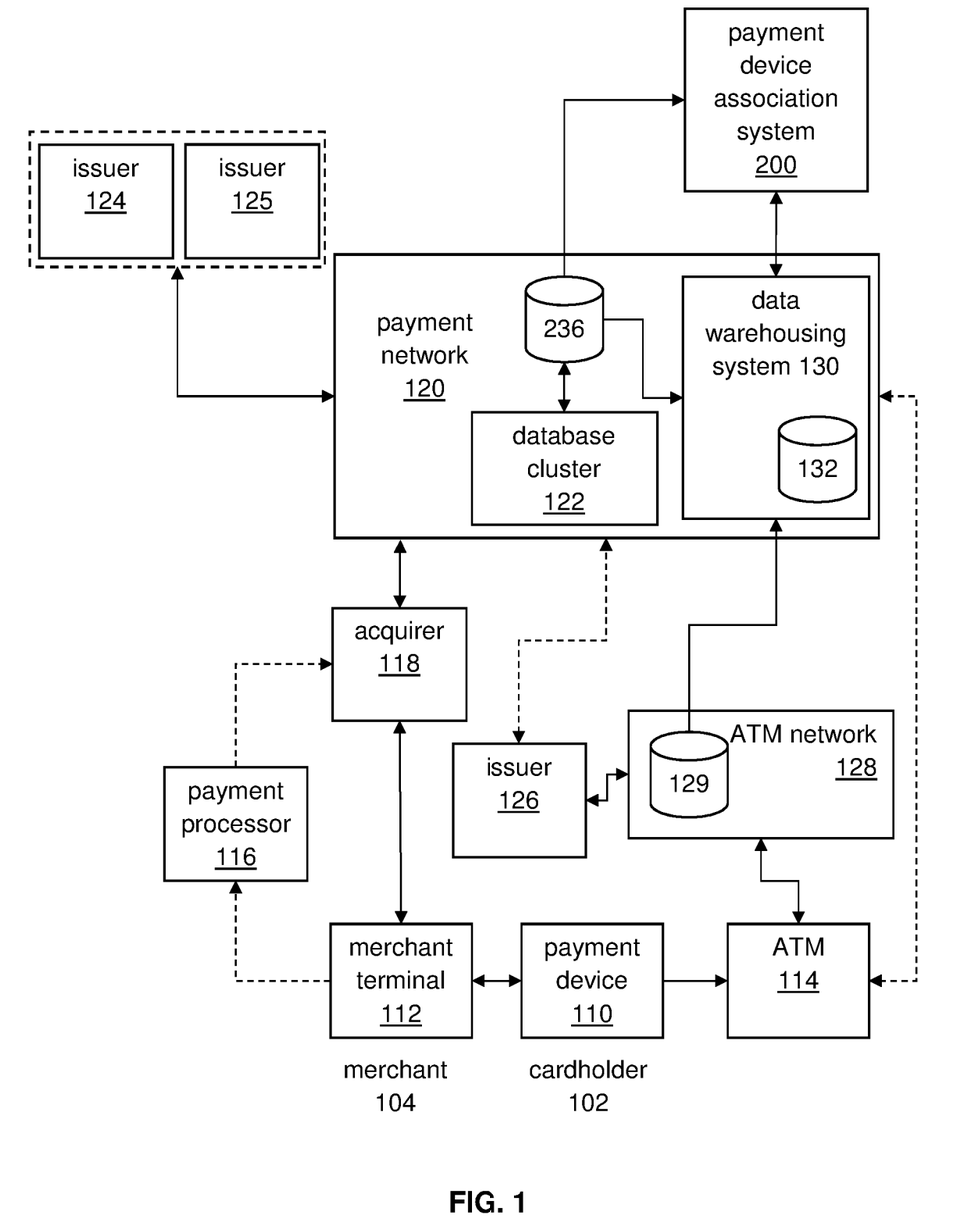
FIG. 1 is a block diagram showing a payment processing system in communication with a payment device association system.

For example, as shown in FIG. 1, a payment processing system comprises a payment network 120, such as the payment networks operated by MasterCard or VISA. The payment network 120 acts as an intermediary during a transaction being made by a cardholder 102 using a payment device 110 at a merchant terminal 112 of a merchant 104.

In particular, the cardholder 102 may present payment device 110 to merchant terminal 112 of merchant 104 as payment for goods or services. The merchant terminal 112 may be a point of sale (POS) device such as a magnetic strip reader, chip reader or contactless payment terminal, or a website having online e-commerce capabilities, for example. A merchant 104 may operate one or a plurality of merchant terminals 112. The merchant terminal 112 communicates with an acquirer computer system 118 of a bank or other institution with which the merchant 104 has an established account, in order to request authorisation for the amount of the transaction (sometimes referred to as ticket size) from the acquirer system 118. In some embodiments, if the merchant 104 does not have an account with the acquirer 118, the merchant terminal 112 can be configured to communicate with a third-party payment processor 116 which is authorised by acquirer 118 to perform transaction processing on its behalf, and which does have an account with the acquirer entity.

The acquirer system 118 routes the transaction authorisation request from the merchant terminal 112 to computer systems of the payment network 120. The transaction authorisation request is then routed by payment network 120 to computer systems of the appropriate issuer institution (e.g., issuer 124 or 125) based on information contained in the transaction authorisation request. The issuer institution 124 or 125 is authorised by payment network 120 to issue payment devices 110 on behalf of customers 102 to perform transactions over the payment network 120. Issuer 124 or 125 also provides funding of the transaction to the payment network 120 for transactions that are approved.

The computer systems of issuer 124 or 125 analyse the authorisation request to determine the account number submitted by the payment device 110, and based on the account number, determine whether the account is in good standing and whether the transaction amount is covered by the cardholder's account balance or available credit. Based on this, the transaction can be approved or declined, and an authorisation response message transmitted from issuer 124 or 125 to the payment network 120, which then routes the authorisation response message to the acquirer system 118. Acquirer system 118, in turn, sends the authorisation response message to merchant terminal 112. If the authorisation response message indicates that the transaction is approved, then the account of the merchant 104 (or of the payment processor 116 if appropriate) is credited by the amount of the transaction.

During each authorisation request as described in the previous paragraphs, the payment network 120 stores transaction information in a transactions database 236 accessible via a database cluster 122. The database cluster 122 may comprise one or more physical servers. In some embodiments, the transactions database 236 may be distributed over multiple devices which are in communication with one another over a communications network such as a local-area or wide-area network. In some embodiments, the transactions database 236 may be in communication with a data warehousing system 130 comprising a data warehouse database 132 which may store copies of the transaction data, and/or cleaned and/or aggregated data which are transformed versions of the transaction data. Transaction records (or aggregated data derived therefrom) may be directly accessible for the purposes of performing analyses, for example by payment device association system 200, from transactions database 236. Alternatively, or in addition, the transaction records (or aggregated data derived therefrom) may be accessed (for example, by payment device association system 200) from the data warehouse database 132. Accessing the transaction records from the data warehouse database 132, instead of the transactions database 236, has the advantage that the load on the transactions database 236 is reduced.

In some embodiments, transaction data can be captured from automated teller machines (ATMs) and stored in data warehouse database 132. For example, a cardholder 102 may use a payment device 110 (typically a payment card such as a debit card, although alternative devices such as NFC-enabled mobile devices may be used with suitably-enabled ATMs) to request funds or to carry out another transaction, such as a bill payment, at an ATM 114. The request is routed by ATM 114 to an ATM network 128, which may be an interbank network such as Cirrus of MasterCard Inc. or Plus of Visa Inc. The ATM network 128 analyses the request to determine the identity of the issuing bank 126 of the payment device 110, and routes the request to computer systems of the issuer 126. Computer systems of issuer 126 analyses the request to determine the account number associated with the payment device 110, determines whether the account has sufficient funds to satisfy the request, and sends an authorisation response message (which may indicate whether the transaction is approved or declined, together with a decline code) to the ATM network 128. The ATM network 128 then routes the authorisation response message to ATM 114, which in the case that the cardholder 102 has requested a cash withdrawal, dispenses cash (if the request is approved) or displays a message that the transaction has been declined (if the request is declined). A transaction record is stored in transactions database 129 of the ATM network 128.

Periodically, the ATM network 128 may transfer transactions data from the transactions database 129 to the data warehouse database 132, such that ATM transactions are available for analysis and reporting.

In some embodiments, the payment network 120 may also act as the ATM network 128. That is, the ATM 114 may communicate with payment network 120 (as shown by the dotted line in FIG. 1) to route the cardholder's 120 transaction request to issuer 126. In that case, the transaction record associated with each transaction would be captured in transactions database 236 of the payment network 120 as mentioned above.

The transaction records may comprise a plurality of fields, including acquirer identifier/card accepter identifier (the combination of which uniquely defines the merchant); merchant category code (also known as card acceptor business code), that is, an indication of the type of business the merchant is involved in (for example, a gas station); cardholder base currency (i.e., U.S. Dollars, Euros, Yen, etc.); the transaction environment or method being used to conduct the transaction; product specific data such as SKU line item data; the transaction type; card identifier (e.g., card number); time and date; location (full address and/or GPS data); transaction amount (also referred to herein as ticket size); terminal identifier (e.g., merchant terminal identifier or ATM identifier); and response code (also referred to herein as authorization code). Other fields may be present in each transaction record.

Each terminal identifier may be associated with a merchant 104, for example in a merchant database (not shown) of the payment network 120. Typically, a particular merchant 104 will have a plurality of merchant terminal identifiers, corresponding to merchant terminals 112, associated with it.

In the transaction process described above, if an attempt by cardholder 102 to carry out a transaction is unsuccessful and a decline code is received at merchant terminal 112, the cardholder 102 may subsequently attempt the same transaction using a second, different, payment device 110. The second payment device may be associated with an account operated by the same institution as that operating the account associated with the first payment device, or alternatively the two accounts may be operated by different institutions.

For example, the first payment device may be linked to a first account operated by first issuer 124. If the transaction is declined, for example due to there being insufficient funds in the first account, the cardholder 102 may attempt the same transaction with a second payment device linked to a second account operated by second issuer 125. The second payment device may be owned by a different person, for example. In this way, since the payment network 120 records, in transactions database 236, both the first, failed transaction and the subsequent transaction within a short time frame, it is possible to detect associations, or at least potential associations, between payment device which may be owned by different persons and which may even be issued by different issuers 124 and 125. As such, data captured by payment network 120 may be used by issuers to determine cardholders who are associated with each other, for the purposes of targeted advertising based on spend history of the associated cardholders, for example.

Figure 2:
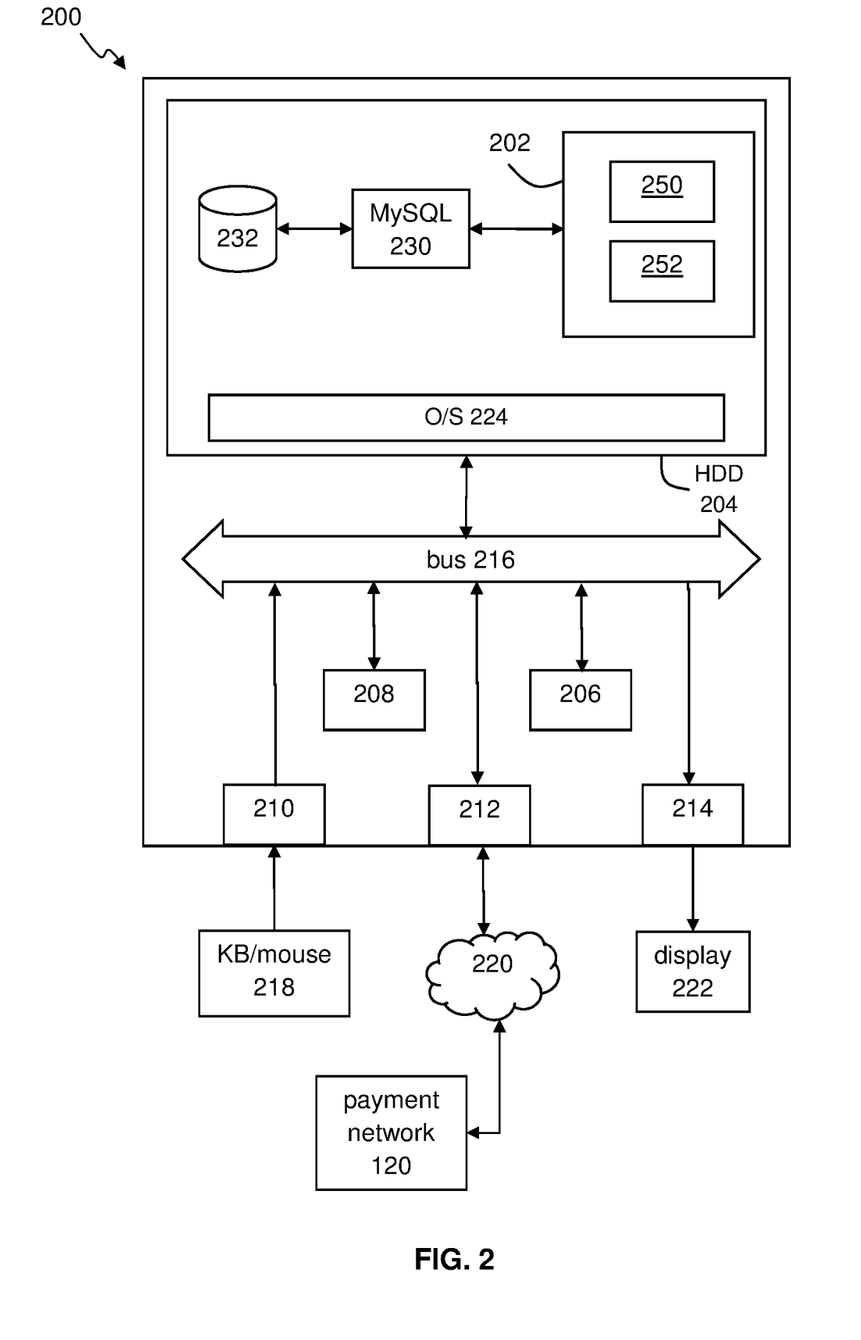
FIG. 2 is a block diagram of the payment device association system of the system of FIG. 1.

Embodiments of the present invention comprise a payment device association system 200 which receives transaction data from the payment network 120 (e.g., from transactions database 236 or data warehouse database 132) and analyses the transaction data to identify associated payment devices. In the presently described embodiments, the system for detecting associated payment devices is a standard computer system such as an Intel IA-32 based computer system 200, as shown in FIG. 2, and the associated payment device associations processes executed by the system 200 are implemented in the form of programming instructions of one or more software modules or components (such as association detection component 250 and false positive detection component 252) stored on tangible and non-volatile (e.g., solid-state or hard disk) storage 204 associated with the computer system 200, as shown in FIG. 2. However, it will be apparent that the processes could alternatively be implemented, either in part or in their entirety, in the form of one or more dedicated hardware components, such as application-specific integrated circuits (ASICs), and/or in the form of configuration data for configurable hardware components such as field programmable gate arrays (FPGAs), for example.

As shown in FIG. 2, the system 200 includes standard computer components, including random access memory (RAM) 206, at least one processor 208, and external interfaces 210, 212, 214, all interconnected by a bus 216. The external interfaces include universal serial bus (USB) interfaces 210, at least one of which is connected to a keyboard 218 and pointing device such as a mouse, and a network interface connector (NIC) 212 which connects the system 200 to a communications network 220 such as the Internet, via which the transactions database 236 and/or data warehouse database 132 containing the transaction data can be accessed by the payment device association system 200.

The system 200 optionally includes a display adapter 214, which is connected to a display device such as an LCD panel display 222, and a number of standard software modules, including an operating system 224 such as Linux or Microsoft Windows. The system 200 may include structured query language (SQL) support 230 such as MySQL, available from http://www.mysql.com, which allows data to be stored in and retrieved from an SQL database 232, including data representing detected associations between cards generated by the system. In some embodiments the data representing the detected associations may also (or instead) be stored directly in data warehouse database 132.

Figure 3:
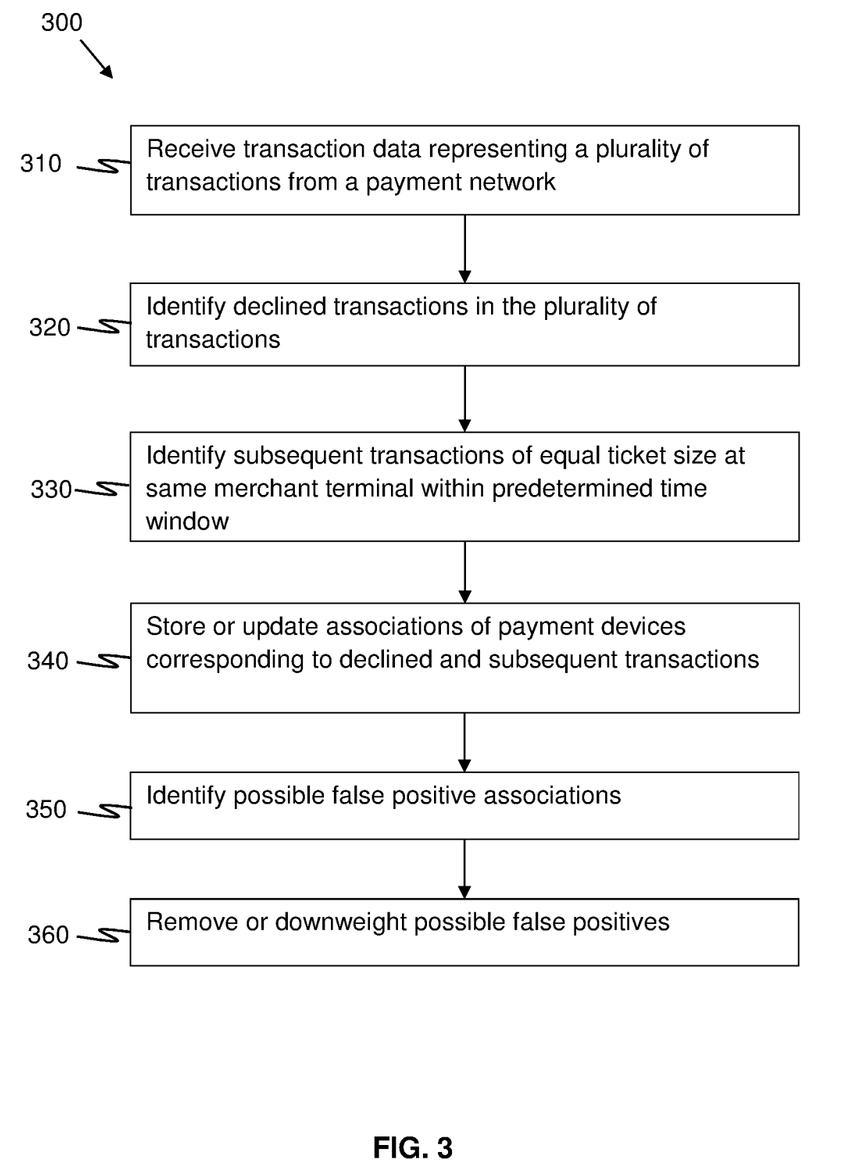
FIG. 3 is a flow chart of a computer-implemented process for identifying associated payment devices.

Referring now to FIG. 3, there is shown a process 300 for associating payment cards. The process 300 may be implemented by the associations detection component 250 and the false positive detection component 252.

In one embodiment of the process 300, the associations detection component 250 receives, at step 310, transaction data representing a plurality of transaction records from the payment network 120 (e.g., from transactions database 236 or data warehouse database 132) via network interface 212. The transaction data may be locally stored on storage medium 204. For example, transaction data from a particular date range may be extracted by associations detection component 250 from transactions database 236, transferred over communications network 220, and stored in local database 232 of the system 200 for further analysis. Alternatively, the extracted transaction data need not be locally stored on storage medium 204, but could be stored on one or more external database servers, such as data warehouse database 132.

At step 320, associations detection component 250 searches transaction records in the local database 232, the data warehouse database 132 or the transactions database 236 to identify declined transactions. In one example, it does this by searching the transaction records according to the value of the authorization code. Associations detection component 250 may generate a database query for a particular authorization code or a set or range of authorization codes corresponding to different types of declined transaction. For each declined transaction, the card identifier, the terminal identifier, transaction amount, and time and date of transaction are retrieved.

At step 330, for each declined transaction, associations detection component 250 then searches the transaction records for subsequent transactions which fulfil the following search criteria: same terminal identifier as the terminal identifier of the declined transaction; same transaction amount as the transaction amount of the declined transaction; and transaction date and time within a predetermined time window of the declined transaction. A subsequent transaction fulfilling these criteria has a high likelihood of having been made with a payment device which is associated with the payment device which made the first, declined transaction.

The predetermined time window may be set according to an average time between transactions for the particular merchant associated with the terminal identifier, an average time between transactions for a particular merchant category (determined according to the merchant category codes of the transaction records, for example), or an average time between transactions across all merchants, for example. Some types of merchant will have different average transaction times to other types of merchant. For example, terminals located in convenience stores may typically exhibit shorter average between-transaction times than terminals located in department stores or restaurants. Similarly, ATMs and other self-service terminals may exhibit shorter average between-transaction times than merchant terminals. The predetermined time window may be in the range from about 10 seconds to about 60 seconds, for example.

In general, the predetermined time window will vary from merchant to merchant, and may be dependent on the mode of transaction (e.g., magnetic stripe, Chip & Pin, Chip & Sign, NFC/tap, card not present etc.), the industry of transaction (Restaurant, Grocery, Transport, etc., for example as determined from the merchant category codes of the transaction records) and the type of terminal (dial up connection, LAN, wireless). The predetermined time window may also be dependent on 'time of day' and 'day of week'—as the merchant may try to complete the same transaction faster during 'high volume' periods in order to minimise waiting time for customers. Accordingly, a number of different factors may be taken into account in order to obtain a more precise estimate of the time window used for detection of a given declined transaction, to reduce the possibility of a false positive detection.

Any such subsequent transaction found at step 330 may be tentatively identified as being made by a second payment device (such as a payment card) which is associated with the first payment device which requested the declined transaction, and the second payment device may be tagged as being associated with the first payment device (step 340). This may be done by, for example, creating an association between the first card and the second card (via their respective card identifiers) in the local database 232 and/or the data warehouse database 132. The association may be represented by a Boolean variable, or may be represented by an integer variable which is a counter for the number of times that the first and second cards are detected as being associated, for example. In other embodiments the association may be represented by a confidence score which reflects an association strength between the payment devices. The confidence score may be a probability, for example. In some embodiments the probability may be an output of a probabilistic classifier (wherein the classes may be "associated" and "not associated"). In embodiments where the association is a counter or other cumulative confidence score, step 340 may comprise determining whether the payment devices are already associated (in local database 232 or data warehouse database 132), and if so, updating the association by incrementing the counter or other cumulative confidence score.

In some embodiments, one or more additional constraints may be placed on identification of the subsequent transaction, to prevent false positive detections. A false positive detection could be particularly problematic if, for example, two completely unrelated individuals were identified as being from the same household, and were inadvertently sent promotional material relating to a joint credit card facility.

For example, at step 350 of the exemplary process 300, false positive detection component 252 may stratify the transaction records according to their respective merchant identifiers or merchant terminals. For each merchant identifier or merchant terminal, false positive detection component 252 may compute a distribution of the transaction amounts for that merchant/terminal from the corresponding transaction records. If one or more transaction amounts occurs particularly frequently for a particular merchant or terminal, it may indicate that there is a high likelihood that using transaction amount as a variable for detecting association will result in false positives. Accordingly, if the declined transaction is for one of the most frequent amounts, the process may remove or downweight (by decrementing the above-mentioned association counts, or downweighting the confidence score, for example) the previously detected association between the first and second payment devices. Any merchant or terminal which has a particularly high frequency of a single transaction amount (ticket size), for example more than 50% of the transactions for that merchant/terminal, may be flagged as one which should not be used for detection.

At step 360, if the declined transaction is from a terminal/merchant which has been identified at step 350 as one which should be given less weight or ignored, the association of the first and second cards may be removed or decreased. For example, the false positive detection component 252 may set the association variable to FALSE (if Boolean), or may decrement or fail to increment the association counter for the first and second cards.

In some embodiments, the order of operations in process 300 may be altered, so that the identification of merchants for which a majority of the transactions are the same size is performed before attempting to infer any associations between cards.

Figure 4:
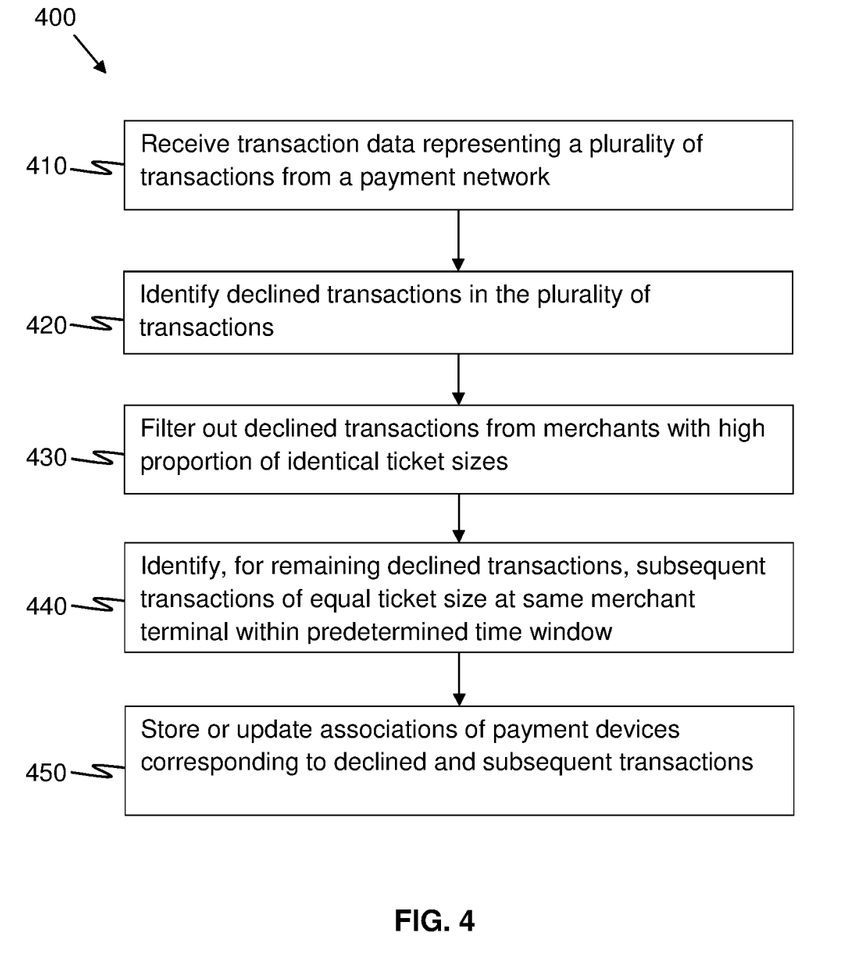
FIG. 4 is a flow chart of an alternative computer-implemented process for identifying associated payment devices.

For example, the alternative process 400 shown in FIG. 4 may make use of previously determined data relating to typical merchant transaction amounts in order to determine that data from particular merchants should not be used to detect associations. The data relating to typical merchant transaction amounts may be generated by the false positive detection component 252 by computing distributions of transaction amounts for each merchant as discussed above. The false positive detection component 252 may generate, based on the computed distributions, a list of merchants which are likely to produce false positives, and the list of merchants may be used as input by associations detection component 250 in the process 400. The list of merchants may be determined once from a particular transaction data set and stored in data warehouse database 132 for use in future analyses. The list may also be updated periodically as further transaction data is collected by the payment network 120.

In process 400, transaction data are received by associations detection component 250 from the payment network 120 (step 410), and declined transactions are identified from the transaction data as described above (step 420). Next, at step 430, the associations detection component 250 generates a reduced data set, by using the list of merchants from false positive detection component 252 to filter out declined transactions for merchants matching those in the list. At step 440, the reduced data set is analysed by identifying, for each remaining declined transaction, a subsequent transaction of the same ticket size as the declined transaction, at the same merchant terminal within a predetermined time window (which may be determined in much the same manner as described for process 300). At step 450, for each identified subsequent transaction, the associations detection component 250 may store (in local database 232 or data warehouse database 132) an association between the payment device corresponding to the declined transaction, and the payment device corresponding to the subsequent transaction. As discussed above in relation to the process 300, if the association is a counter or other cumulative confidence score, step 450 may comprise determining whether the payment devices are already associated in local database 232 or data warehouse database 132, and if so, updating the association by incrementing the counter or other cumulative confidence score.

Advantageously, by using a predetermined list of merchants which are likely to produce false positive detections, the quantity of data to be analysed may be reduced such that the subsequent detection of associated payment devices is made more computationally efficient.

Whilst the foregoing description has described exemplary embodiments, it will be understood by those skilled in the art that many variations in details of design, construction and/or operation may be made without departing from the scope of the present invention.

The invention claimed is:

1. A computer-implemented method of detecting associated payment devices, the method comprising:
   receiving, by a processor from a payment network, transaction data representing a plurality of transaction records, each transaction record comprising a payment device identifier, a transaction amount, a transaction time, a terminal identifier, and a result code indicating success or failure of a transaction;
   determining from the transaction data, by said processor, a list of merchants likely to cause false positive detections, wherein a merchant is added to the list of merchants based on having a number of transaction amounts that are the same transaction amount and wherein the number is greater than a predetermined percentage of transaction amounts for the merchant;
   from a subset of the plurality of transaction records corresponding to a merchant not included in the list of merchants, identifying by said processor, a declined transaction associated with a first payment device identifier, and determining a terminal identifier and transaction amount associated with the declined transaction;
   identifying from the subset of the plurality of transaction records, by said processor, a subsequent transaction occurring within a predetermined window of the declined transaction, the subsequent transaction being associated with the same terminal identifier and the same transaction amount as the declined transaction, the subsequent transaction being associated with a second payment device identifier that is different from the first payment device identifier;
   storing, in a database, an association between the second payment device identifier and the first payment device identifier;
   determining, using said processor, whether a particular terminal identifier is associated with a merchant in said list of merchants; and
   updating the database to remove or downweight said association corresponding to the particular terminal identifier.

2. The computer-implemented method according to claim 1, wherein the predetermined window is a predetermined time window.

3. The computer-implemented method according to claim 2, wherein the predetermined time window is dependent on one or more criteria selected from: merchant; merchant category; time of day; day of week; mode of transaction; and terminal type.

4. The computer-implemented method according to claim 3, comprising determining the predetermined time window by: identifying, using said processor, transaction records satisfying the one or more criteria; and determining, using said processor, from the time and date fields of the transaction records satisfying the one or more criteria, an average or median time between transactions; whereby the predetermined time window is the average or median time between transactions.

5. The computer-implemented method according to claim 1, wherein the predetermined percentage is 50%.

6. The computer-implemented method according to claim 1, further comprising, prior to identifying the declined transaction, filtering the transaction data using said processor to remove transaction records corresponding to merchants in said list of merchants.

7. A system for detecting associated payment devices, comprising an association detection component which is configured to:
receive, from a payment network, transaction data representing a plurality of transaction records, each transaction record comprising a payment device identifier, a transaction amount, a transaction time, a terminal identifier, and a result code indicating success or failure of a transaction;
determine, by a false positive detection component and from the transaction data, a list of merchants likely to cause false positive detections, wherein a merchant is added to the list of merchants based on having a number of transaction amounts that are the same transaction amount and wherein the number is greater than a predetermined percentage of transaction amounts for the merchant;
from a subset of the plurality of transaction records corresponding to a merchant not included in the list of merchants, identify a declined transaction associated with a first payment device identifier, and determine a terminal identifier and transaction amount associated with the declined transaction;
identify, from the subset of the plurality of transaction records, a subsequent transaction occurring within a predetermined window of the declined transaction, the subsequent transaction being associated with the same terminal identifier and the same transaction amount as the declined transaction, the subsequent transaction being associated with a second payment device identifier that is different from the first payment device identifier;
store, in a database, an association between the second payment device identifier and the first payment device identifier;
determine whether a particular terminal identifier is associated with a merchant in said list of merchants; and
update the database to remove or downweight said association corresponding to the particular terminal identifier.

8. The system according to claim 7, wherein the predetermined window is a predetermined time window.

9. The system according to claim 8, wherein the predetermined time window is dependent on one or more criteria selected from: merchant; merchant category; time of day; day of week; mode of transaction; and terminal type.

10. The system according to claim 9, wherein the association detection component is configured to determine the predetermined time window by: identifying transaction records satisfying the one or more criteria; and determining, from the time and date fields of the transaction records satisfying the one or more criteria, an average or median time between transactions; wherein the predetermined time window is the average or median time between transactions.

11. The system according to claim 7, wherein the predetermined percentage is 50%.

12. The system according to claim 7, wherein the false positive detection component is configured to filter the transaction data to remove transaction records corresponding to merchants in said list of merchants.

13. A non-transitory computer-readable medium for detecting associated payment devices, the computer-readable medium having stored thereon program instructions for causing at least one processor to:
receive, from a payment network, transaction data representing a plurality of transaction records, each transaction record comprising a payment device identifier, a transaction amount, a transaction time, a terminal identifier, and a result code indicating success or failure of a transaction;
determine, from the transaction data, by said processor, a list of merchants likely to cause false positive detections, wherein a merchant is added to the list of merchants based on having a number of transaction amounts that are the same transaction amount and wherein the number is greater than a predetermined percentage of transaction amounts for the merchant;
from a subset of the plurality of transaction records corresponding to a merchant not included in the list of merchants, identify a declined transaction associated with a first payment device identifier, and determining a terminal identifier and transaction amount associated with the declined transaction;
identify, from the subset of the plurality of transaction records, a subsequent transaction occurring within a predetermined window of the declined transaction, the subsequent transaction being associated with the same terminal identifier and the same transaction amount as the declined transaction, the subsequent transaction being associated with a second payment device identifier that is different from the first payment device identifier;
store, in a database, an association between the second payment device identifier and the first payment device identifier;
determine whether a particular terminal identifier is associated with a merchant in said list of merchants; and
update the database to remove or downweight said association corresponding to the particular terminal identifier.

14. The non-transitory computer-readable medium according to claim 13, wherein the predetermined window is a predetermined time window.

15. The non-transitory computer-readable medium according to claim 14, wherein the predetermined time window is dependent on one or more criteria selected from: merchant; merchant category; time of day; day of week; mode of transaction; and terminal type.

16. The non-transitory computer-readable medium according to claim 15, further comprising program instructions for causing the at least one processor to determine the predetermined time window by: identifying transaction records satisfying the one or more criteria; and determining, from the time and date fields of the transaction records satisfying the one or more criteria, an average or median time between transactions; whereby the predetermined time window is the average or median time between transactions.

17. The non-transitory computer-readable medium according to claim 13, wherein the predetermined percentage is 50%.

18. The non-transitory computer-readable medium according to claim 13, further comprising program instructions for causing the at least one processor to, prior to identifying the declined transaction, filter the transaction data to remove transaction records corresponding to merchants in said list of merchants.

\* \* \* \* \*